Figure 7:
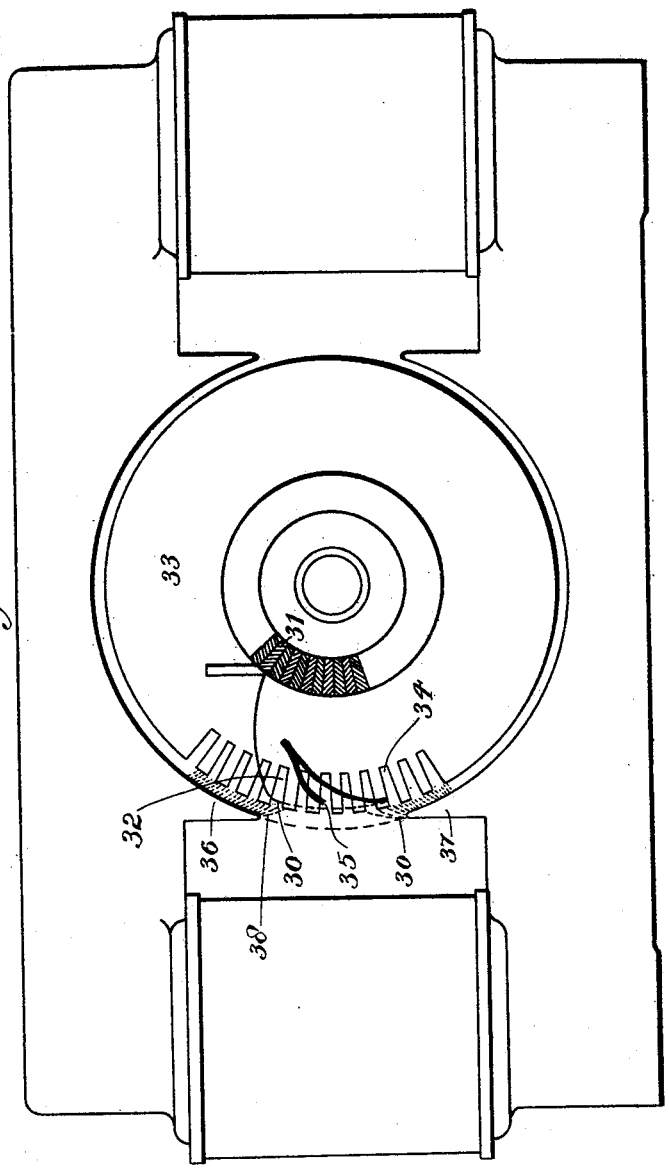

No. 614,964. Patented Nov. 29, 1898.
J. S. LEWIS & F. J. HOWITT.
DYNAMO ELECTRIC MACHINERY.
(Application filed Mar. 12, 1898.)
(No Model.) 6 Sheets—Sheet 1.
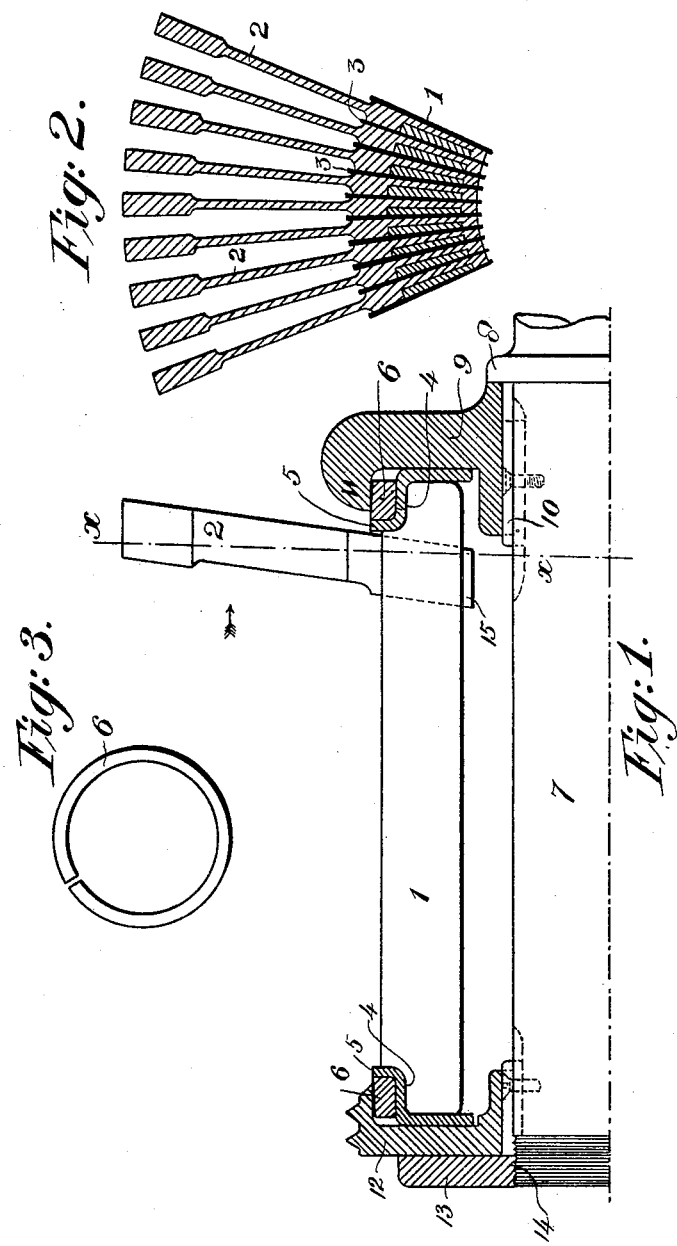
Witnesses
Edwin Drew Bartlett
Arthur John Stephens
Inventors
Joseph Slater Lewis and Felix John Howitt
per Herbert Lefton-Jones
Attorney No. 614,964. Patented Nov. 29, 1898.
J. S. LEWIS & F. J. HOWITT.
DYNAMO ELECTRIC MACHINERY.
(Application filed Mar. 12, 1898.)
(No Model.) 6 Sheets—Sheet 2.
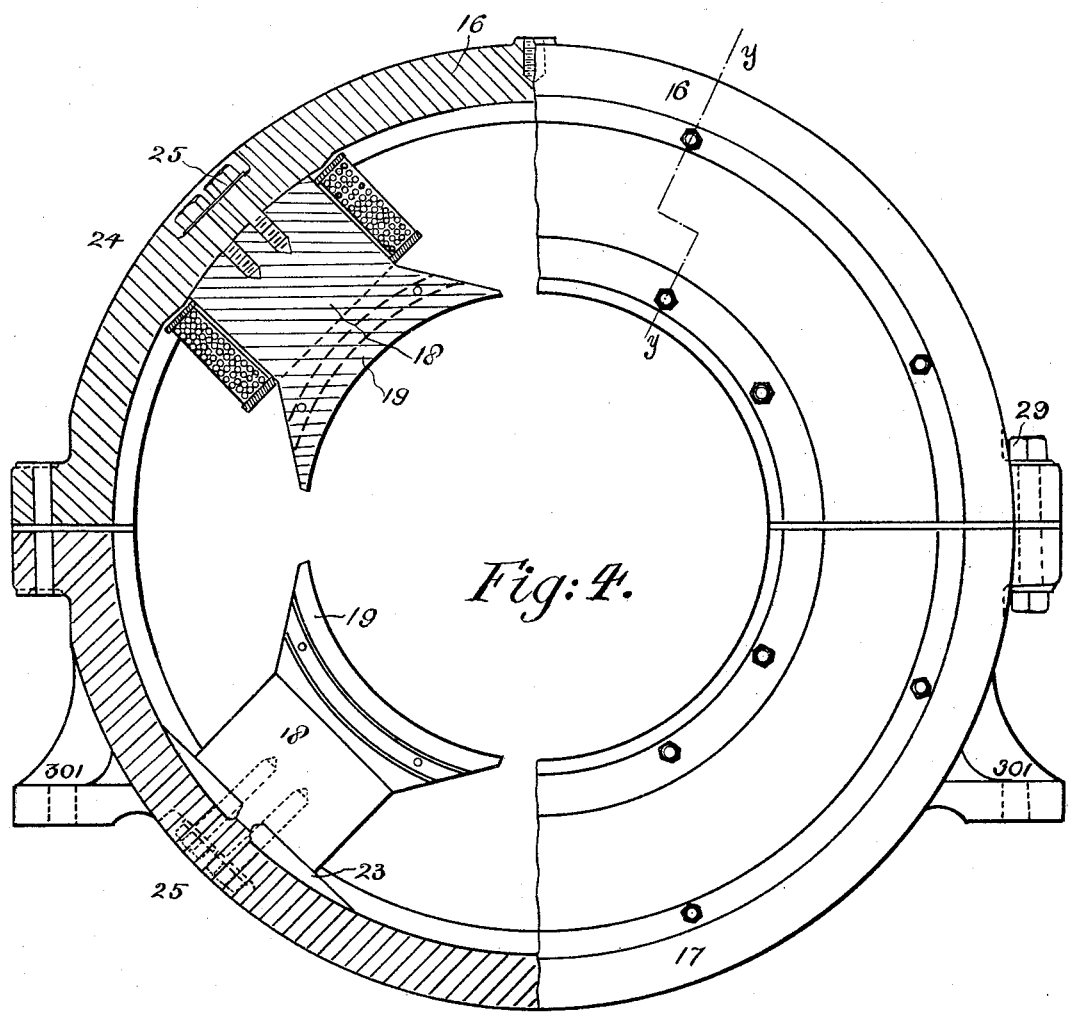
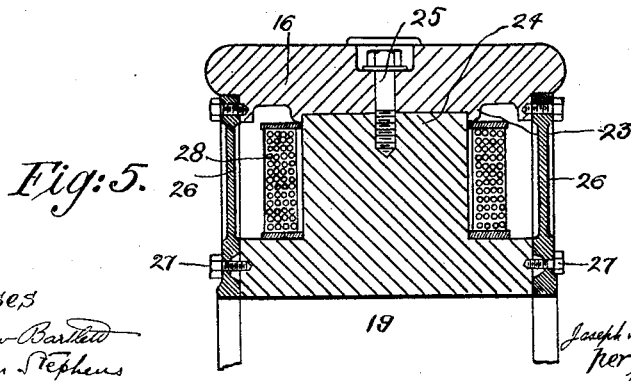
Witnesses
Edwin Drew Bartlett
Arthur John Stephens
Inventors
Joseph Slater Lewis and John Felix Howitt
per Herbert Sefton-Jones
Attorney No. 614,964. Patented Nov. 29, 1898.
J. S. LEWIS & F. J. HOWITT.
DYNAMO ELECTRIC MACHINERY.
(Application filed Mar. 12, 1898.)
(No Model.) 6 Sheets—Sheet 3.
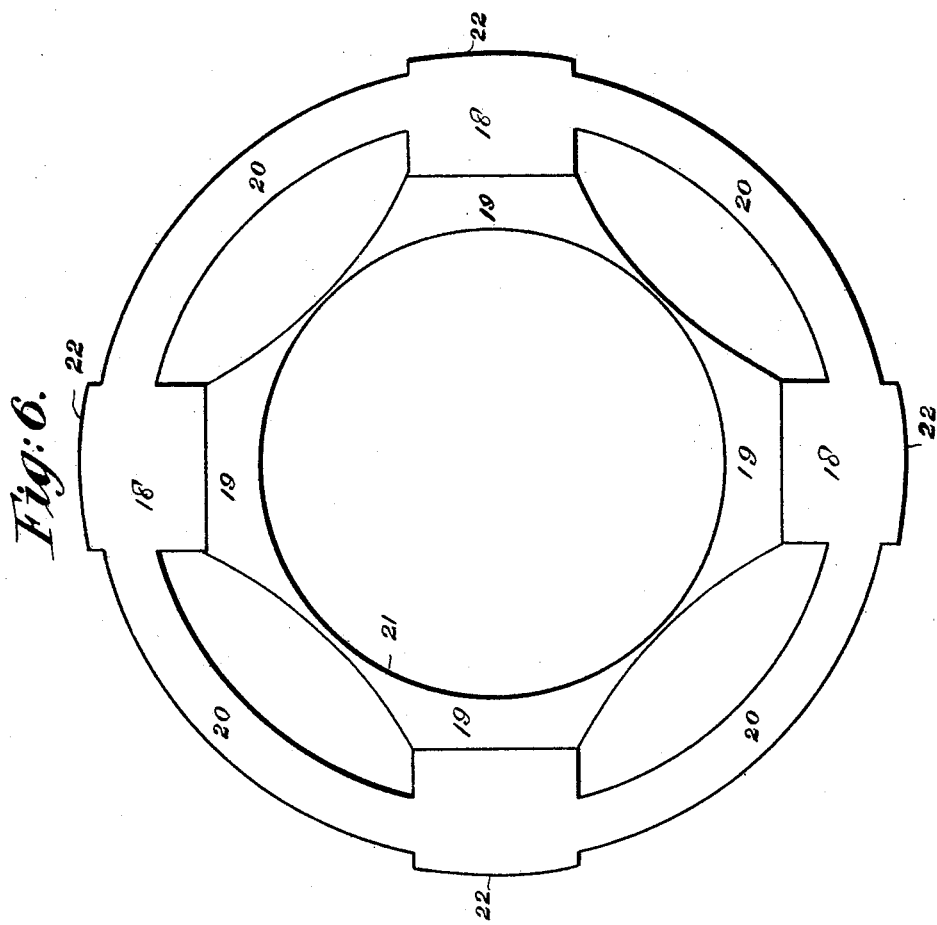

No. 614,964. Patented Nov. 29, 1898.
J. S. LEWIS & F. J. HOWITT.
DYNAMO ELECTRIC MACHINERY.
(Application filed Mar. 12, 1898.)

(No Model.) 6 Sheets—Sheet 4.

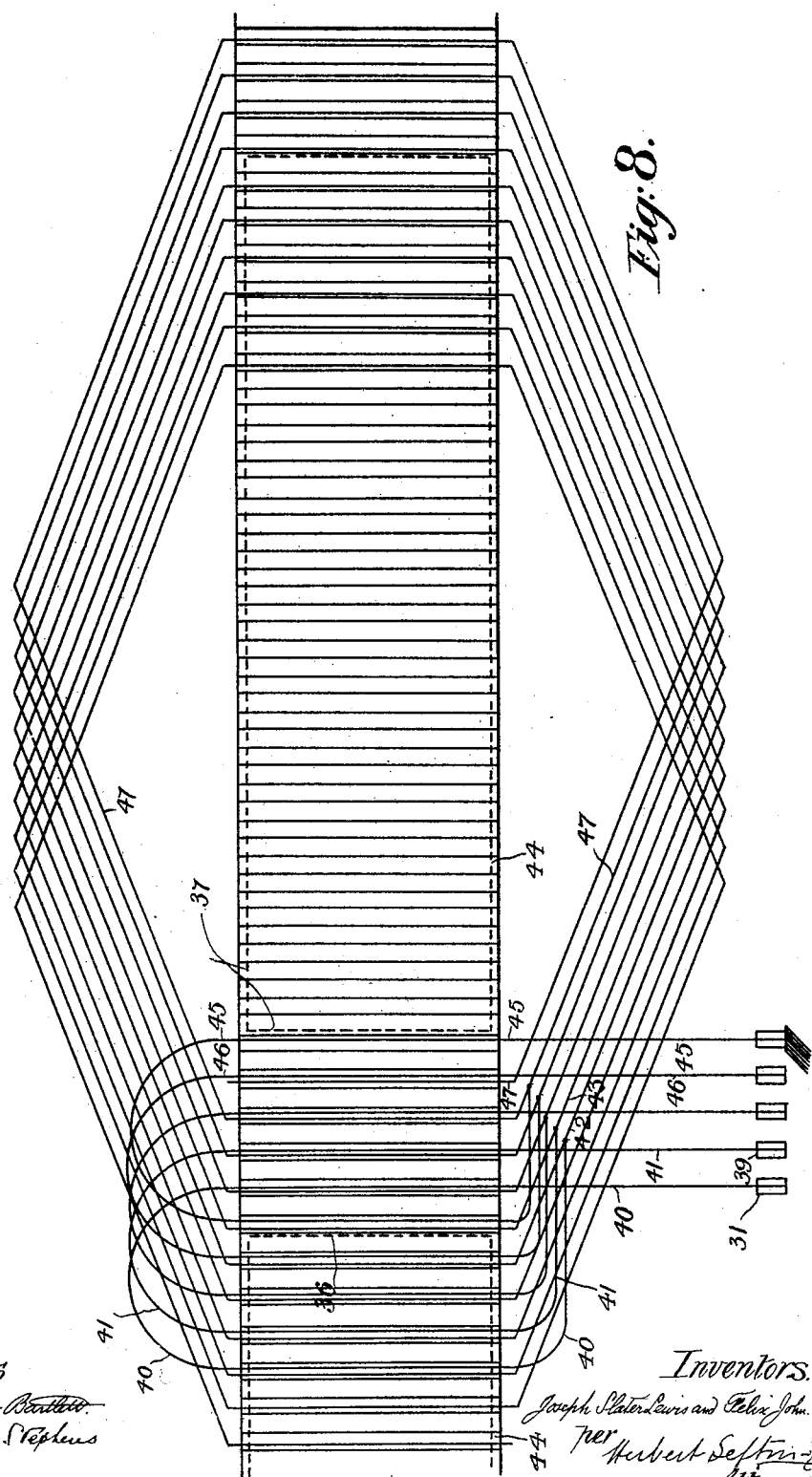

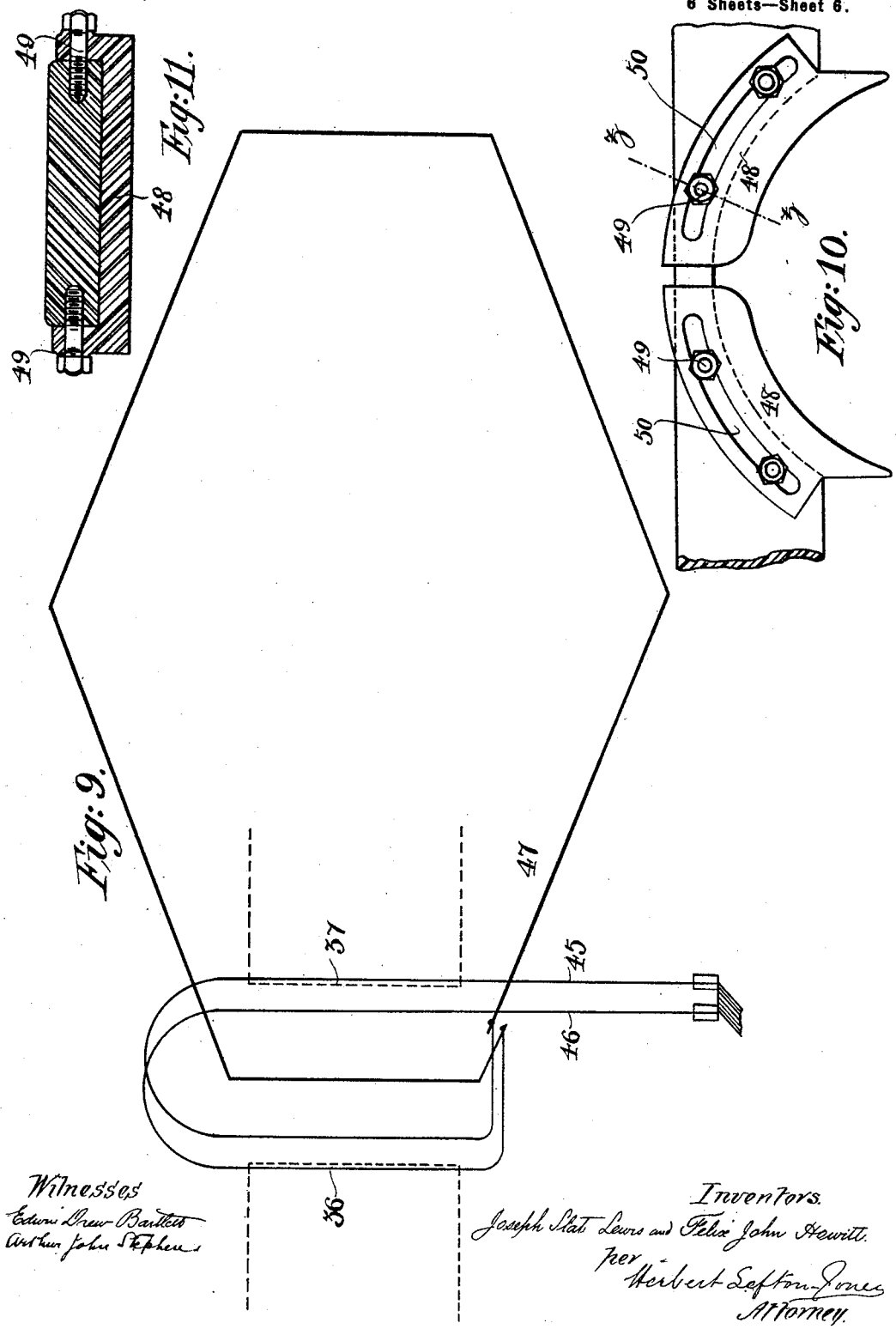

UNITED STATES PATENT OFFICE.

JOSEPH SLATER LEWIS AND FELIX JOHN HOWITT, OF MANCHESTER, ENGLAND, ASSIGNORS TO THE P. R. JACKSON & COMPANY, LIMITED, OF SAME PLACE.

DYNAMO-ELECTRIC MACHINERY.

SPECIFICATION forming part of Letters Patent No. 614,964, dated November 29, 1898.

Application filed March 12, 1898. Serial No. 673,599. (No model.)

*To all whom it may concern:*

Be it known that we, JOSEPH SLATER LEWIS and FELIX JOHN HOWITT, engineers, subjects of the Queen of Great Britain, residing at Salford Rolling Mills, Manchester, in the county of Lancaster, England, have invented a certain new and useful Improvement in Dynamo-Electric Machinery, (for which applications for patents have been filed in the following countries, as follows: France, February 25, 1898; Norway, February 15, 1898; Switzerland, February 14, 1898; Russia, March 2, 1898; Canada, February 22, 1898, and Sweden, February 15, 1898, and patented in the following countries, as follows: Great Britain, No. 21,180, dated September 15, 1897; Germany, No. 99,554, dated November 28, 1897; Belgium, No. 134,098, dated February 28, 1898; Austria, No. 48/1,896, dated April 5, 1898, and Hungary, No. 12,198, dated February 14, 1898;) and we do hereby declare that the following is a full, clear, and exact description of the same.

Our invention relates to dynamo-electric machines and motors and comprises an improved construction of commutator for use in direct-current dynamos and motors and also an improved construction of field-magnet for dynamos and motors having four or a greater number of poles.

Our invention further comprises improvements particularly applicable to those machines in which additional coils or bars are provided on the armature for the purpose of reversing the current in the armature-coils at the time of commutation.

The object of our invention is to cheapen the construction of machines, at the same time rendering the same stronger and less liable to get out of order.

A further object of our invention is to construct a direct-current machine in which the position of the brushes is practically fixed and in which no sparking at the brushes occurs.

Our invention is illustrated in the accompanying drawings, which we will now describe.

Figure 1 is a longitudinal section illustrating our improved construction of commutator. Fig. 2 is a section on the line $x\ x$, Fig. 1, looking in the direction of the arrow. Fig. 3 is a detail view hereinafter explained. Fig. 4 is an end elevation, partly in section, illustrating the field-magnet of a four-pole machine constructed in accordance with our invention. Fig. 5 is a section on the line $y\ y$, Fig. 4. Fig. 6 is an end elevation of a casting from which we construct the cores and pole-pieces of the magnet. Fig. 7 is an end view, somewhat diagrammatic, of a dynamo provided with reversing-coils on the armature and constructed according to our invention. Figs. 8 and 9 are diagrams hereinafter explained. Fig. 10 is an end view of an improved construction of pole-pieces. Fig. 11 is a section on line $z\ z$, Fig. 10.

Referring now to Figs. 1 and 2, the commutator blades or segments are indicated at 1, and the radial strips connecting the blades or segments with the ends of the armature-conductors are shown at 2. In constructing our improved commutator the blades or segments, with the radial strips attached, are assembled in position with insulation 3 interposed between adjacent segments. They are then compressed radially inward by any suitable means, so as to form a rigid cylinder. The ends of the blades are formed with a rabbet, over which insulation 5 is placed, and then a sliding ring 6 is shrunk onto each end of the cylinder. After said ring has cooled the primary restraining and compressing means are removed, the segments of the commutator being secured in place by the rings aforementioned at each end. It may be desirable in some cases to roll or press down the rings when in position and while hot in order that they shall grip the ends of the bars more securely. Instead of heating the rings and allowing them to cool after being placed in position we may employ for securing the same a method similar to that now well known for setting wheel-tires in the cold state by means of hydraulic rams arranged radially outside the tire. In order to secure the commutator in position on the dynamo-spindle, we proceed as follows: The spindle 7 has a shoulder 8 formed thereon, and a collar 9 is provided, abutting against said shoulder. Said collar is prevented from turning on the spindle 7 by a key 10, which may be secured in a keyway in said spindle. The collar has an overhanging lip 11, forming an annular groove, which is adapted to receive the ring 6 on the end of the commutator when the latter is slipped into position, as shown. A second collar 12, similar to the collar 9, is now slipped over the ring at the outer end of the commutator, and a nut 13, engaging with a screw-thread 14, is screwed tightly against the collar 12, forcing the same along the spindle and causing the commutator to be gripped tightly between the two collars.

The rings 6 are preferably somewhat tapered externally, as shown, so that the endwise pressure of the nut 13 causes the rings to jam firmly in the annular channels in their respective collars, the driving power being transmitted from the spindle to the commutator through the rings. In lieu of shrinking the rings 6 onto the ends of the commutator-segments we sometimes use rings with a transverse saw-cut, as shown in Fig. 3, which can be sprung into position on the segments, or rings in two or more pieces and tapered externally to engage with internally-tapered collars may be employed.

The radial strips 2, which connect the commutator-segments with the armature-conductors, are preferably secured to the segments before the latter are assembled in the manner following—that is to say, at or near the end of each segment a groove is milled out approximately half through the segment and of a width corresponding to that of the end 15 of the radial strip 2. The radial strip to be secured to the segment is formed to the desired section with a transverse groove near its end, as shown in Fig. 2, to fit the groove in the segment, and the strips and segments are secured together by sweating or brazing at the half-joint. It will be observed that by reason of the groove in the strips being made at a little distance from the end of the same a hook is formed which engages with the commutator-segment and effectually prevents the strip from being withdrawn radially without actual breakage of the commutator. The grooves in the commutator-segments and in the strips are so formed that the strip makes a suitable angle with the commutator.

We will now refer to Figs. 4 to 6, which illustrate our improved construction of field-magnet as applied to a four-pole machine. It will be understood, however, that the same method is applicable for constructing multipolar machines, in which the magnet-cores and pole-pieces project from the outer periphery of the ring. The ring, as shown in Fig. 4, is formed of halves 16 17, secured together by bolts 29, the lower half being provided with suitable projecting wings 301, by which it may be secured to the foundations or to the rails supporting the machine. The magnet-cores (four in number in the present instance) are indicated at 18 and the pole-pieces at 19.

According to our invention we cast the four magnet-cores 18 and the pole-pieces 19 in one casting, preferably of steel, an end elevation of which is shown in Fig. 6, the cores being connected by segments of an annulus 20 at their outer ends and the pole-pieces being connected together on their tips, so that a sound casting is very readily obtained. The casting is machined at the ends of the pole-pieces 19. The "headers" when cast in steel are cut off, the central hole 21 turned out truly to suit the armature, and the outer ends 22 of the cores turned cylindrical, and it will be observed that the machining being accomplished in the lathe or other special machine-tool can be done very cheaply. After this is finished the magnet-cores, still connected, as shown in Fig. 6, are placed between the rings 16 and 17, which had been meanwhile prepared at their inside to properly fit the ends of the cores. We prefer to provide projections 23 on the inner peripheries of the ring 16 17, in which projections a groove 24 is turned out adapted to fit the ends 22 of the magnet-core 18. The halves 16 and 17 having been placed in position inclosing the cores, holes are drilled, and the bolts 25 are fitted for securing said cores in place. At the same time two gun-metal annular plates 26 are fitted, as shown in Fig. 5, at each end, so as to inclose the magnet-cores and pole-pieces. Said plates may be provided with orifices or slots to permit of ventilation. The bolts 27 for securing these in place are screwed into the pole-pieces and into the outer ring, as shown. It is obvious that the gun-metal plates 26 may take various forms and be fitted and secured in several different ways, all of which fall within the scope of our invention. The car-case is now taken to pieces, the several parts being marked before so doing, so that they can be readily put together again, and the casting is divided at the proper place between the pole-pieces 19, the spans of the polar faces cut down to their proper limit, and the outer segments 20 of the annulus are cut away. The cores and poles are now secured to the gun-metal rings or plates 26 by the bolts 27. The coils 28, which may be previously wound upon formers, are slipped into position on the cores, and the connections between the field-magnet coils are made, when the whole can be lifted into position between the halves 16 17 of the outer ring and secured there by the bolts 25, the two halves being fastened by the bolts 29.

By our improved method of construction we not only secure an accurate fit between the several parts composing the field-magnet, but this is done with a minimum of cost, because nearly all the machining is done in the lathe with about two "chuckings." Furthermore, very little time need be spent in finishing the coils and making connections neatly, since all this portion of the work is hidden, or partially so, if desired, by the gun-metal rings or plates 26. These rings are furthermore very useful in steadying and checking noise and vibrations due to magnetism and in assisting to support the cores and poles at their proper distances from each other.

In Fig. 7 we illustrate an improved construction of dynamo in which additional coils or bars are provided on the armature for the purpose of reversing the current in the armature-coils at the time of commutation. Armatures constructed in this manner are now well known under the name of "Sayers" armatures, and the additional coils are called "Sayers" coils. With pole-pieces of the ordinary construction only one side of a loop forming a Sayers coil is utilized, such loop being provided in order to render the direction of rotation of the armature reversible. Therefore, in order to utilize both sides of the loop and thus increase the power of the machine, auxiliary poles were provided in the air-space between the ordinary pole-pieces. These auxiliary poles were either extensions of the ordinary poles or provided with an independent magnetic circuit, with or without magnetizing-coils, there being in either case gaps or air-spaces between the ordinary poles and the auxiliary poles. The ordinary armature-coils at the time of commutation were situated in one of these gaps, so that they were unaffected by the magnetic field. This construction is costly and has other disadvantages. In our improved construction we dispense with auxiliary poles and utilize in lieu thereof the horns of the ordinary pole-pieces by diminishing the distance between said horns. This we do by increasing the angular breadth of the poles until the circumferential distance through the air between the pole-horns is, in consequence of a slight allowance having to be made for the magnetic fringes, slightly greater than the angular breadth of one Sayers coil on the armature. The length or extent of each of the said fringes of each horn may be regarded as approximately equal to the clearance between the armature and the pole-pieces. By this arrangement we insure that as soon as one side of a Sayers coil has quitted the magnetic field of one pole-piece the other side of the said coil will have entered the magnetic field of the next pole-piece. In the figure a Sayers coil 30 is shown starting from the commutator-sector 31 and through a slot 32 in the armature-core 33, returning up through a slot 34 in said core, there being five teeth between slots 32 and 34, between two of which teeth the armature-bar 35, connected to said Sayers coil, is located. The figure shows that the distance between the pole-tips 36 37 is a little greater than the span of the coil 30, because the lines of magnetic force shown by the dotted lines 38 spread out from the pole-tips. The spreading of the field will in general depend upon the degree of magnetic saturation of the armature-teeth under the pole-tips. Hence taking into account this "fringing" of the fields, one side of the loop 30 practically leaves the field of one pole-tip at the same time as the other side of the loop enters the field of the other pole-tip, and as one side of the loop becomes practically inactive the other side in advance becomes active. In order to render this construction more clear, we have shown in Fig. 8 a diagram of the development of an armature, the commutator-sectors 31 39 being joined through the Sayers loops 40 41 to the armature-bars 42 43. The pole-pieces are shown at 44 in dotted lines, the distance from the tip 36 to the tip 37 being a little greater than the span of the Sayers loop 45.

Referring now to Fig. 9, which shows two Sayers coils 45 and 46 symmetrically disposed about the pole-horns 36 and 37, and consequently in active operation, the armature-coil 47, to which the said Sayers coils are connected, is approximately midway between the said pole-horns, and consequently outside the magnetic field of either of them. The span of each said Sayers coil is so arranged that a minimum amount of magnetic leakage from the poles passes into the armature at the region traversed by the said main coil during reversal consistent with a maximum angular breadth of pole - pieces. In designing the pole-horns we arrange that the section shall be sufficient across the direction of the magnetic flux to carry the necessary flux into the regions of the armature immediately under the pole-tips traversed by the Sayers coils during commutation in order that the reversal of the current in the main coils may be completed, and at the same time the magnetic parts behind the said pole-horns are as far as possible kept away from the spaces between opposite pole-horns, so that there will be as little leakage into the armature in those spaces as possible consistent with the necessary "shading" or gradual diminution of the field required to prevent undue sensitiveness of the brushes. Similar considerations in respect to these two last conditions are well understood with Sayers machines already built with and without auxiliary poles.

In Figs. 10 and 11 we show an improved construction of pole-pieces, which is more especially intended for use in experimental machines, though it may be employed in ordinary machines, if desired. The curved portions of each pole-piece opposite the armature are formed of two plates 48 of a suitable thickness, the division line or lines between the said plates being parallel to the armature-shaft. The plates embrace the poles, being secured by means of studs and nuts 49, passing through circular slots 50. The said plates can therefore be adjusted upon the poles so as to vary the angular breadth of the pole-pieces, the small gap, which is formed when the plates are moved apart, having little if any effect upon the working of the machine. With a dynamo or motor furnished with this construction of pole - pieces we can very readily determine experimentally the angular breadth of pole-pieces which gives the best results without calculating the amount of the fringing or spreading of the magnetic field. We may further provide in connection with our said improved pole-pieces removable or adjustable pole-tips so arranged that by suitable slots and locking-nuts the tips of the said pole-pieces may be thickened up to the required extent, and the section in this way controlled in the manner hereinbefore described.

The improvements in Sayers dynamos, hereinabove described, are of course applicable to motors, and although we have illustrated a two-pole machine in the drawings relating to these improvements the invention is equally applicable to four-pole or multipolar machines.

What we claim is—

1. In dynamo-electric machines, the combination with the armature-spindle of a series of commutator-segments, insulating material interposed between adjacent segments, rings under centripetal pressure surrounding the assembled segments and insulation at each end thereof, collars keyed to the spindle, annular grooves in said collars engaging with the rings, and means for forcing said collars nearer together, so as to grip the rings, substantially as set forth.

2. In dynamo-electric machines, the combination with the armature-spindle of a series of commutator-segments, insulating material interposed between adjacent segments, rings shrunk on the assembled segments and insulation at each end thereof, collars keyed to the spindle, annular grooves in said collars engaging with the rings, and means for forcing said collars nearer together, so as to grip the rings, substantially as set forth.

3. In dynamo-electric machines, the combination with the armature-spindle of a series of commutator-segments, insulating material interposed between adjacent segments, externally-tapered rings under centripetal pressure, surrounding the assembled segments and insulation at each end thereof, collars keyed to the spindle, annular grooves in said collars engaging with the rings, and means for forcing said collars nearer together, so as to grip the rings, substantially as set forth.

4. In dynamo-electric machines the combination with the armature of a series of metallic segments and interposed insulation assembled together forming a commutator, means for securing said commutator to the armature-spindle, a series of radial strips each said strip connected at one end to an armature-coil and having a transverse groove near its other end engaging with a transverse groove in the commutator-segment to which it is to be connected as set forth.

5. In a multipolar dynamo-electric machine, a field-magnet comprising an outer magnet-ring, inwardly-projecting radial magnet-cores secured to said ring, and annular plates of non-magnetic metal secured to said ring and to the cores, as and for the purpose set forth.

6. In dynamo-electric machines, the combination with the armature-coils, of commutating-coils located upon the periphery of the armature each such commutating-coil connecting the junction of the adjacent armature-coils to the corresponding commutator-bar, and a field-magnet having the air-space between the forward horn of one pole and the back horn of the next pole approximately equal to the span of a commutating-coil, for the purpose specified.

7. In dynamo-electric machines, the combination with the armature-coils, consecutively connected in series with one another, of commutating-coils located upon the periphery of the armature each such commutating-coil connecting the junction of the adjacent armature-coils to the corresponding commutator-bar, and a field-magnet having its poles of such angular breadth that the circumferential distance in air between the magnetic field fringing the forward tip of one pole and the field fringing the back tip of the next pole is approximately equal to the span of such a commutating-coil, for the purpose specified.

8. In dynamo-electric machines, the combination with the armature of additional coils connected between each armature-coil and its corresponding commutator-bar, and a field-magnet the angular breadth of whose pole-surface can be varied, substantially as set forth.

In witness whereof we have hereunto set our hands in presence of two witnesses.

JOSEPH SLATER LEWIS.
FELIX JOHN HOWITT.

Witnesses:
JAS. STEWART BROADFOOT,
PERCY WILLIAM HOLT.